United States Patent
Uwabo et al.

[11] Patent Number: 6,134,082
[45] Date of Patent: Oct. 17, 2000

[54] FLOPPY DISK DEVICE WITH A PAIR OF DOUBLE-LINERS HOLDING A FLOPPY DISK BY THE DOUBLE-LINER PAIR

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 09/159,862

[22] Filed: Sep. 24, 1998

[30] Foreign Application Priority Data

Sep. 26, 1997 [JP] Japan ................................ 9-261479

[51] Int. Cl.[7] ................................................ G11B 23/03
[52] U.S. Cl. .............................................................. 360/133
[58] Field of Search ............................... 360/133; 369/291

[56] References Cited

U.S. PATENT DOCUMENTS

| 4,680,661 | 7/1987 | Oishi | 360/133 |
| 4,695,912 | 9/1987 | Moriwaki | 360/133 |

FOREIGN PATENT DOCUMENTS

| 7-73636 | 7/1995 | Japan . |
| 7-272429 | 10/1995 | Japan . |

OTHER PUBLICATIONS

S. Takahashi; "The Whole of Floppy Disk Apparatus"; 1989; 3 pages; published by CQ Publishing Co., Ltd. on Jul. 10, 1990.

Primary Examiner—David Davis
Attorney, Agent, or Firm—Fishauf, Holtz, Goodman, Langer & Chick, P.C.

[57] ABSTRACT

A recording disk device comprises a sheet-like magnetic disk medium having at least one recording surface, a jacket body enclosing the magnetic disk medium and having first and second inner surfaces faced to both surfaces of the magnetic recording medium, and upper and lower liners attached to the first and the second inner surfaces of the jacket body to remove fine dust adhered to the magnetic recording medium. The recording disk device further comprises upper and lower subsidiary liners each of which is attached to at least a part of each of the upper and the lower liners so that the magnetic disk medium rotated within the jacket body is interposed between the upper and the lower subsidiary liners with both surfaces of the magnetic disk medium kept in contact with the upper and the lower subsidiary liners. The jacket body has upper and lower shells parallel to each other with the upper and the lower liners attached thereto, respectively. The upper and the lower shells have inner surfaces faced to the upper and the lower subsidiary liners through the upper and the lower liners, respectively. At least one of the inner surfaces of the upper and the lower shells is provided with a recess for accommodating a bent portion of the magnetic disk medium when it is deformed or bent.

4 Claims, 6 Drawing Sheets

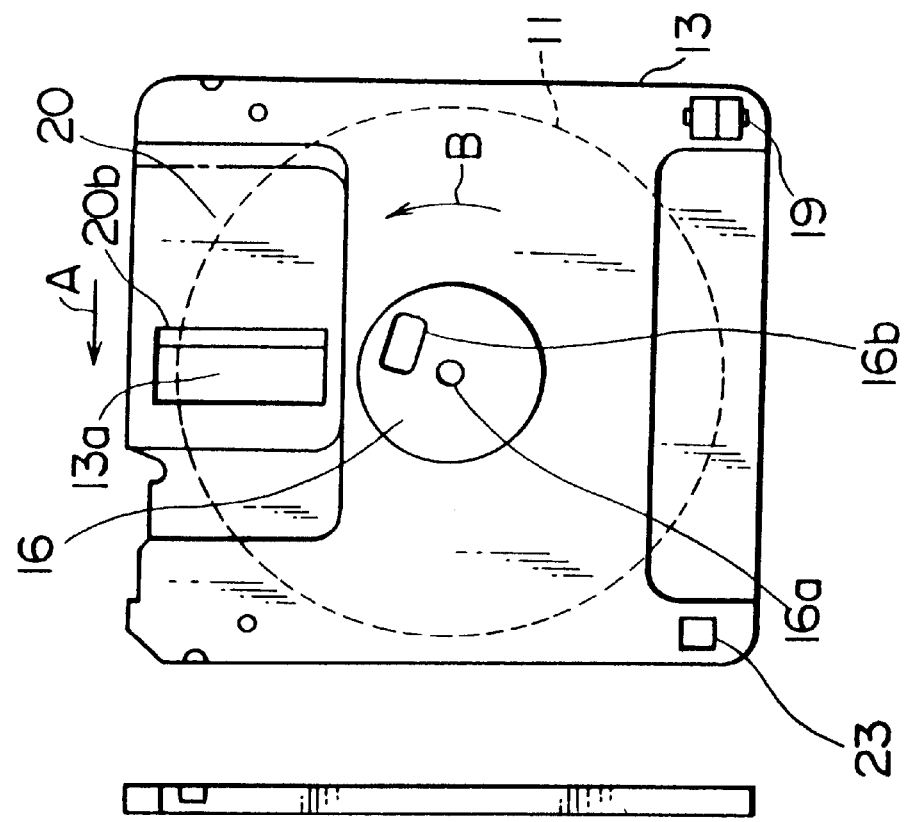
FIG. 2C PRIOR ART
FIG. 2B PRIOR ART
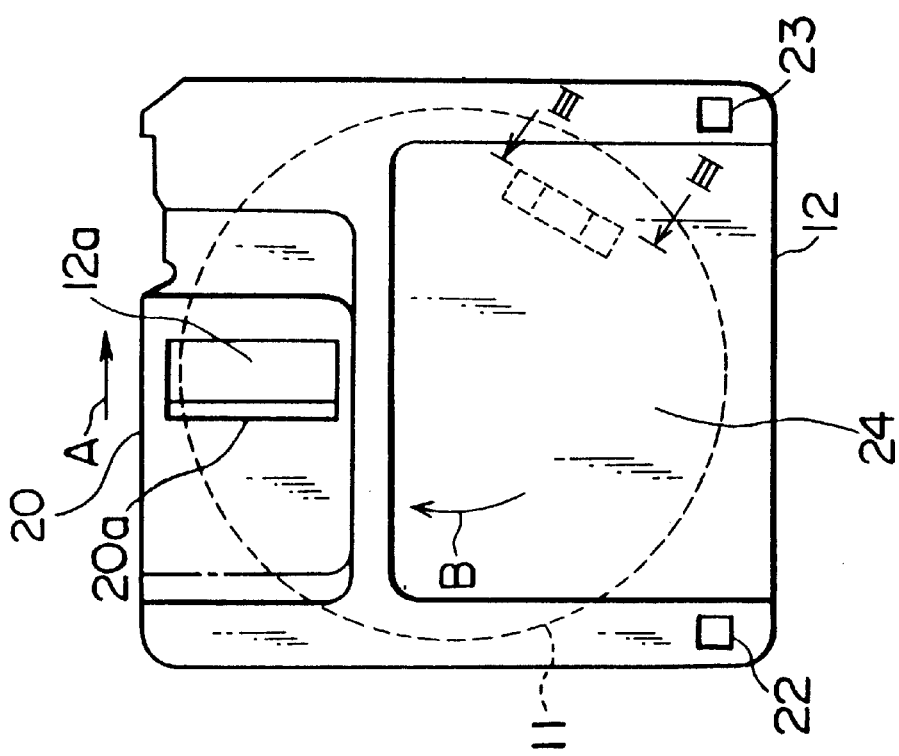
FIG. 2A PRIOR ART

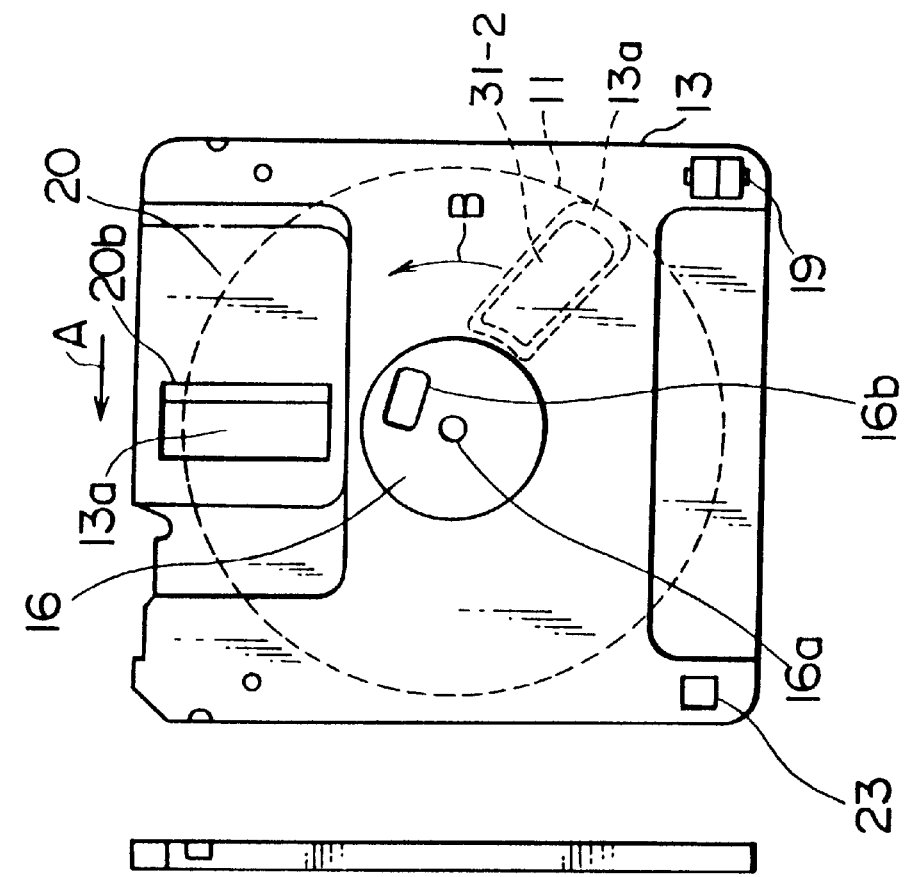
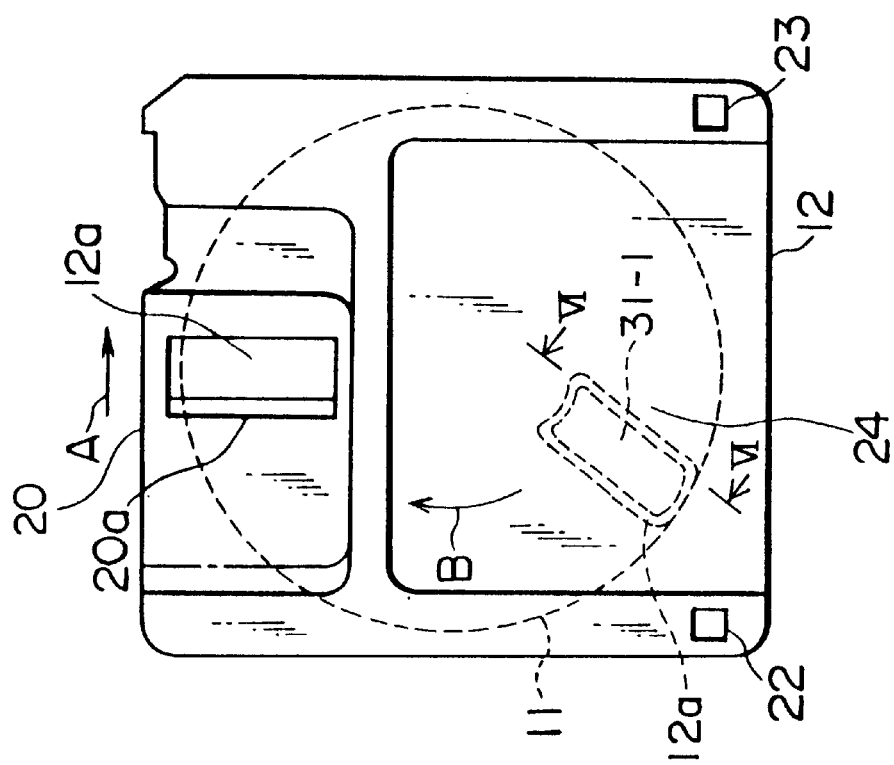
FIG. 5A  FIG. 5B  FIG. 5C

FLOPPY DISK DEVICE WITH A PAIR OF DOUBLE-LINERS HOLDING A FLOPPY DISK BY THE DOUBLE-LINER PAIR

BACKGROUND OF THE INVENTION

This invention relates to a recording disk device, such as a floppy disk device, having a flexible recording disk medium, such as a magnetic disk medium, contained in a cartridge or a jacket.

A conventional recording disk device comprises a magnetic disk medium and a jacket body comprising upper and lower shells forming a space to receive the magnetic disk medium. The upper and the lower shells are provided with upper and lower head windows, respectively, to permit an access to the magnetic disk medium by a pair of magnetic heads. The magnetic disk medium is made of a magnetic material having a flexibility. Upper and lower liners are attached to inner surfaces of the upper and the lower shells, respectively. Each of the liners serves to remove fine dust attracted onto the surface of the magnetic disk medium. Therefore, each liner is preferably arranged as close as possible to the surface of the magnetic disk medium.

For this purpose, a lifter in the form of a leaf spring is attached at its one end to the inner surface of the lower shell. The other end of the lifter pushes the lower liner and the magnetic disk medium upward to press the magnetic disk medium against the upper liner attached to the upper shell. Thus, the lifter serves to enhance partial mutual contact between the magnetic disk medium and each of the upper and the lower liners so that the fine dust adhered to the magnetic disk medium is more effectively removed by the upper and the lower liners during rotation of the magnetic disk medium.

Since the magnetic disk medium comprises a flexible thin sheet typically made of synthetic resin with a magnetic recording layer and a coating layer formed thereon, the magnetic disk medium is partially deformed and bent by receiving the pushing force of the lifter through the lower liner. Accordingly, when the magnetic disk medium rotates, a part of the medium is deformed at a position of the lifter and is then restored by elastic force of the magnetic disk medium itself after passing through the lifter position. Therefore, during the rotation of the magnetic disk medium, a recording surface of the magnetic disk medium is fluttered in the vertical direction.

The above-mentioned fluttering will change the condition of sliding contact between the recording surface of the magnetic disk medium and the magnetic head. This results in unstable reading/writing operations by the magnetic head.

Such tendency is noticeable particularly when the magnetic disk medium has a high recording density, and is more or less responsible for the occurrence of errors in the reading/writing operations by the magnetic head.

Since the magnetic disk medium is partially pushed up by the lifter, a load torque is inevitably increased during the rotation of the magnetic disk medium driven by a motor.

In other words, since the liner is very close to the magnetic disk medium, a torque loss is caused to reduce the torque for rotating the magnetic disk medium by the motor. With an increase in torque loss, data writing/reading operations upon the magnetic disk medium become unstable and unreliable.

Furthermore, the lifter is formed by shaping an elastic plate material and must be securely fixed to the lower shell. This results in a decrease in efficiency in manufacture and assembling.

SUMMARY OF THE INVENTION

It is therefore an object of this invention to provide a recording disk device which is capable of effectively removing fine dust adhered to a magnetic disk medium.

It is another object of this invention to provide a recording disk device which is capable of preventing a magnetic disk medium from being fluttered so as to assure stable reading/writing operations by a magnetic head.

It is still another object of this invention to provide a recording disk device which is capable of reducing a load torque during the rotation of a magnetic disk medium driven by a motor.

It is yet another object of this invention to provide a recording disk device which is easy and efficient to manufacture and assemble.

According to this invention, there is provided a recording disk device comprising a sheet-like magnetic disk medium having at least one recording surface, a jacket body enclosing the magnetic disk medium and having first and second inner surfaces faced to both surfaces of the magnetic recording medium, and upper and lower liners attached to the first and the second inner surfaces of the jacket body to remove fine dust adhered to the magnetic recording medium, the recording disk device further comprising upper and lower subsidiary liners each of which is attached to at least a part of each of the upper and the lower liners so that the magnetic disk medium rotated within the jacket body is interposed between the upper and the lower subsidiary liners with both surfaces of the magnetic disk medium kept in contact with the upper and the lower subsidiary liners.

BRIEF DESCRIPTION OF THE DRAWING

FIGS. 2A through 2C show an external appearance of the floppy disk device illustrated in FIG. 1;

FIGS. 5A through 5C show an external appearance of the recording disk device illustrated in FIG. 4.

DESCRIPTION OF THE PREFERRED EMBODIMENT

Figure 1:
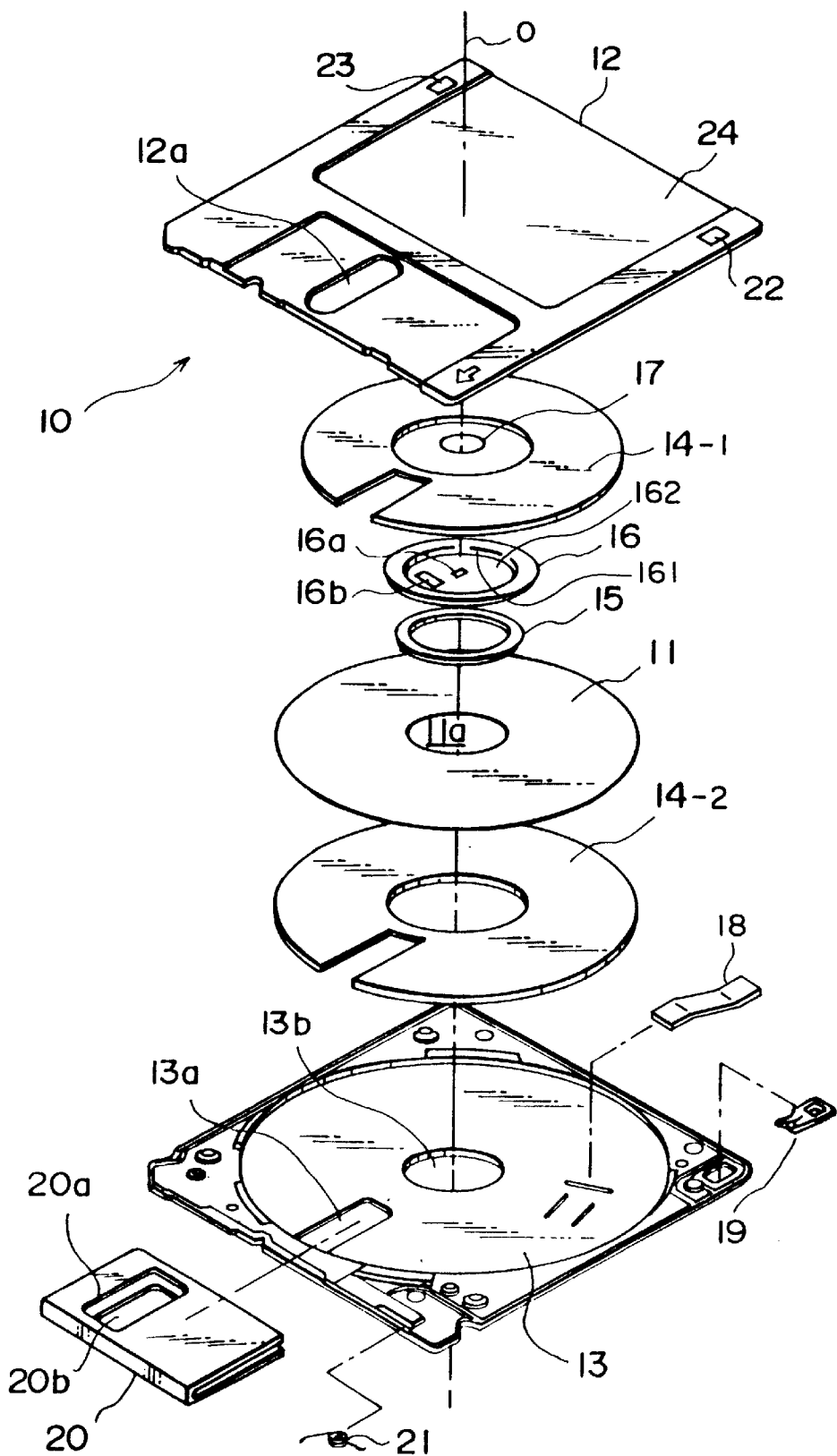
FIG. 1 is an exploded perspective view showing a structure of a 3.5-inch floppy disk device as an example of a conventional recording disk device.

For a better understanding of this invention, description will at first be made about a conventional recording disk device with reference to FIG. 1.

In the following, a 3.5-inch floppy disk device will be described as an example of the recording disk device. The floppy disk device is disclosed in a Japanese book entitled "The Whole of Floppy Disk Apparatus" written by Shoji Takahashi and published by CQ Publishing Co., Ltd. on Jul. 10, 1990, page 160.

Referring to FIG. 1, the floppy disk device depicted at 10 comprises a magnetic disk medium 11, an upper shell 12, a lower shell 13, an upper liner 14-1 adhered to an inner surface of the upper shell 12, and a lower liner 14-2 adhered to an inner surface of the lower shell 13. The magnetic disk medium 11 is received between the upper and the lower liners 14-1 and 14-2. Herein, a combination of the upper and the lower shells 12 and 13 will be called a jacket body. The magnetic disk medium 11 is received in the jacket body. The upper and the lower liners 14-1 and 14-2 serve to remove fine dust attracted to the surfaces of the magnetic disk medium 11. The jacket body is provided with a head window to enable an access by a pair of magnetic heads (not shown) of a disk drive. Specifically, the head window is composed of upper and lower head windows 12a and 13a as rectangular holes formed in the upper and the lower shells 12 and 13, respectively.

The magnetic disk medium 11 has an annular shape with a circular opening 11a formed at its center to be concentric with a center axis O of the magnetic disk medium 11. The magnetic disk medium 11 is supported at the periphery of the circular opening 11a by a metal hub 16 through a double-sided adhesive tape 15 called an A ring.

Referring to FIGS. 2A through 2C in addition, a center plate 17 is interposed between the metal hub 16 and the upper shell 12. To the lower shell 13, a lifter 18 and a write protector 19 are attached. The lifter 18 serves to press the lower liner 14-2 against the magnetic disk medium 11. The lower shell 13 is provided with a circular opening 13b which serves to expose the bottom 162 of the cylindrical portion 161 of the metal hub 16.

The floppy disk device 10 further comprises a metal shutter 20 for opening and closing the upper and the lower head windows 12a and 13a. The shutter 20 is closed when the floppy disk device 10 is not received in the disk drive. This prevents fine dust and various contaminants from entering into the jacket body and makes it difficult for an operator's finger to erroneously touch a recording surface of the magnetic disk medium 11. The shutter 20 has a shutter window for bringing the upper and the lower head windows 12a and 13a into an open state. Specifically, the shutter window has an upper shutter window 20a as a rectangular hole formed in an upper plate of the shutter 20 at a position corresponding to the upper head window 12a, and a lower shutter window 20b as a rectangular hole formed in a lower plate of the shutter 20 at a position corresponding to the lower head window 13a. The shutter 20 is urged by a shutter spring 21 attached to the lower shell 13 in a closing direction depicted at A in FIG. 2A.

Referring to FIGS. 2A and 2C, the shutter 20 is slid against the urging force of the shutter spring 21 (FIG. 1) in a direction reverse to the closing direction A. In this state, the shutter 20 is in an open state to expose the upper and the lower head windows 12a and 13a.

The metal hub 16 serves to chuck the floppy disk device 10 at a disk holding table of the disk drive. Specifically, the metal hub 16 has a center hole 16a formed at its center and a chucking hole 16b formed at a position eccentric with the center hole 16a. To the center hole 16a, a rotary shaft (not shown) of a motor (not shown) is inserted which is for rotating the magnetic disk medium 11 of the floppy disk device 10 in a rotating direction depicted at B in the figure. To the chucking hole 16b, a chucking pin (not shown) formed on the disk holding table is inserted.

The write protector 19, which is called a write protect tab, serves to switch opened/closed states of a write protect hole 22 formed in the jacket body to inhibit a writing operation. When the write protect hole 22 is closed and opened by moving the write protector 19, the floppy disk device 10 is put into a write enable state and a write inhibit state, respectively. The jacket body is further provided with a hole 23 formed at a position symmetrical with the write protect hole 22 to identify the floppy disk device as a high-density (HD) type. The upper shell 12 has a label area 24 formed on an upper surface thereof.

It is noted here that the floppy disk device 10 illustrated in FIG. 1 has a normal storage capacity of 1 Mbyte or 2 Mbytes.

The magnetic disk medium 11 has a thickness of about 62 $\mu$m. Next, a center portion of the magnetic disk medium 11 is removed to form the circular opening 11a. The circular opening 11a has a center coincident with the center axis O. Then, the metal hub 16 is adhered to the upper surface of the magnetic disk medium 11 by the A ring 15. The metal hub 16 may be adhered to the magnetic disk medium 11 by the use of an adhesive instead of the A ring 15.

As described above, the magnetic recording medium illustrated in FIG. 1 is formed by adhering the magnetic disk medium 11 to the metal hub 16. Thus, only the upper surface of the magnetic disk medium 11 is supported by the metal hub 16. In other words, the magnetic disk medium 11 is supported only at its one surface. The magnetic head of the disk drive is brought into contact (hereinafter called "head touch") with the magnetic disk medium 11 for writing/reading operations. The magnetic disk medium 11 is rotated at a high speed, for example, at 3600 rpm in case where the floppy disk device has a large capacity.

Figure 3:
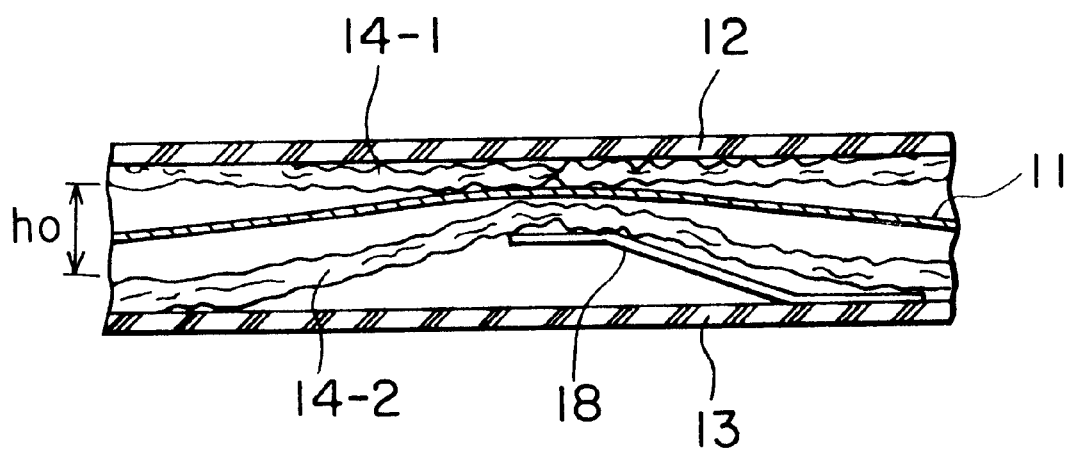
FIG. 3 is a sectional view taken along a line III—III in FIG. 2A.

Turning to FIG. 3, the distance between the upper and the lower liners 14-1 and 14-2 opposite to each other is uniform in the conventional floppy disk device 10 and is depicted at $h_0$ in the figure. Specifically, each of the upper and the lower liners 14-1 and 14-2 has a uniform thickness while each of the inner surfaces of the upper and the lower shells 12 and 13 is flat in a region where the magnetic disk medium 11 is held.

As seen from FIGS. 1 through 3, the lifter 18 in the form of a leaf spring is attached at its one end to the inner surface of the lower shell 13. The other end of the lifter 18 pushes the lower liner 14-2 and the magnetic disk medium 11 upward to press the magnetic disk medium 11 against the upper liner 14-1 attached to the upper shell 12. Thus, the lifter 18 serves to enhance partial mutual contact between the magnetic disk medium 11 and each of the upper and the lower liners 14-1 and 14-2 so that the fine dust adhered to the magnetic disk medium 11 is more effectively removed by the upper and the lower liners 14-1 and 14-2.

Thus, the recording disk device has problems described in the preamble of the present specification.

Now, description will be made as regards a recording disk device according to an embodiment of this invention. Similar parts are designated by like reference numerals as those described in conjunction with FIGS. 1 through 3 and description thereof will be omitted.

Figure 4:
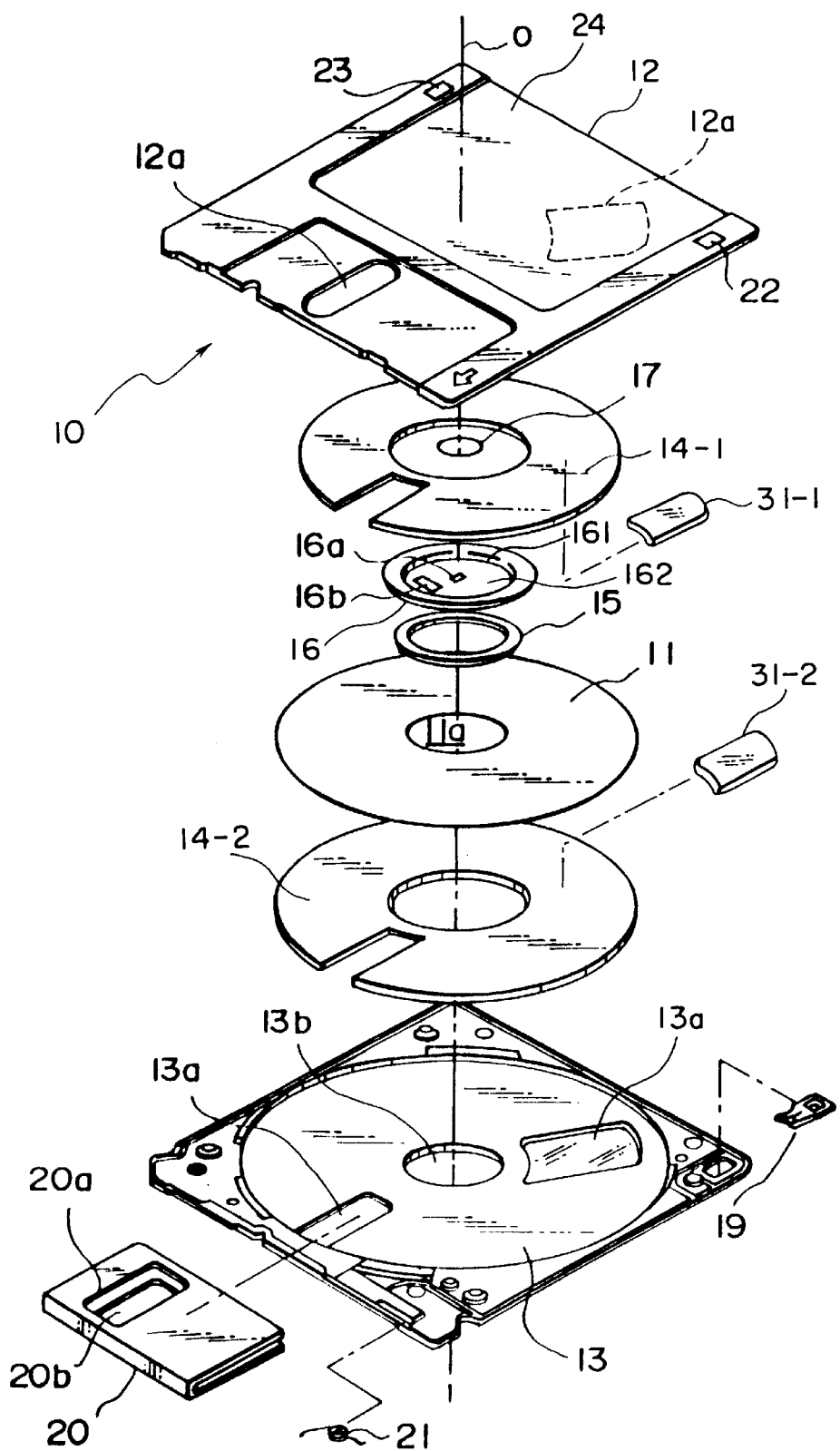
FIG. 4 is an exploded perspective view showing a structure of a recording disk device according to an embodiment of this invention.
Figure 6:
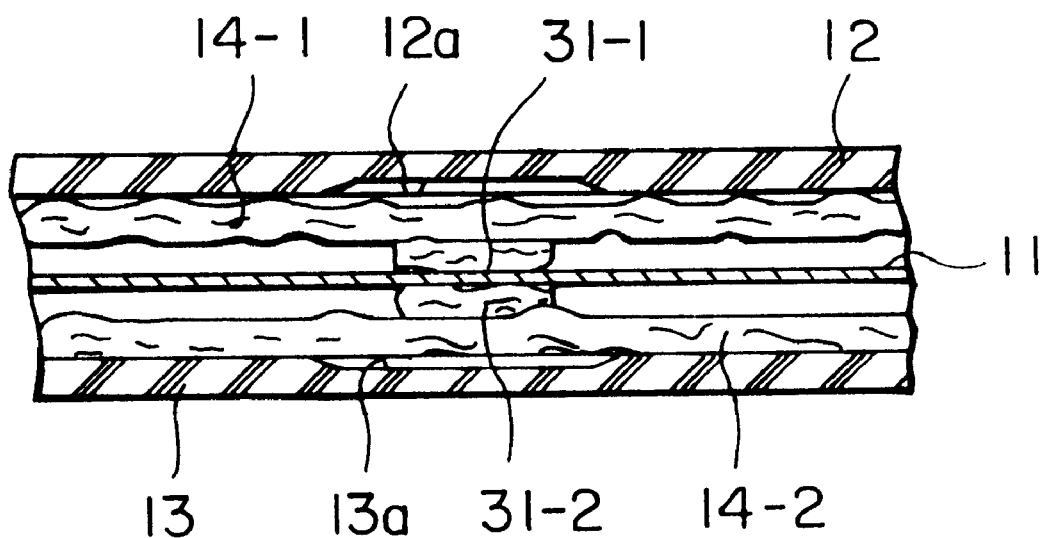
FIG. 6 is a sectional view taken along a line VI—VI in FIG. 5A.

Referring to FIGS. 4 through 6, the recording disk device depicted at 10 has upper and lower subsidiary liners 31-1 and 31-2 attached to upper and lower liners 14-1 and 14-2, respectively.

Each of the upper and the lower subsidiary liners 31-1 and 31-2 is formed on at least a part of each of the upper and the lower liners 14-1 and 14-2 to be brought into contact with each of recording surfaces of a magnetic disk medium 11. The magnetic disk medium 11 typically has the recording surfaces on both sides thereof but sometimes has a single recording surface on its one side alone.

Upper and Lower shells 12 and 13 of synthetic resin are coupled to each other to form a jacket body. For example, each of the upper and the lower liners 14-1 and 14-2 and the upper and the lower subsidiary liners 31-1 and 31-2 comprises a chip of cloth such as nonwoven fabric, for example, rayon. The upper and the lower liners 14-1 and 14-2 are attached to the inner surfaces of the upper and the lower shells 12 and 13 by welding or by an adhesive, respectively.

It is noted here that each of the upper and the lower liners 14-1 and 14-2 need not entirely cover the inner surface of each of the upper and the lower shells 12 and 13 but may cover only a predetermined limited portion thereof. Each of the upper and the lower subsidiary liners 31-1 and 31-2 is attached to a part of each of the upper and the lower liners 14-1 and 14-2 by welding or by an adhesive. The upper and the lower subsidiary liners 31-1 and 31-2 are positioned so that the magnetic disk medium 11 is interposed therebetween, and are brought into contact with the recording surfaces of the magnetic disk medium 11.

When the magnetic disk medium 11 is interposed between the upper and the lower subsidiary liners 31-1 and 31-2, the recording surfaces of the magnetic recording medium 11 are placed in parallel to the upper and the lower shells 12 and 13. The magnetic disk medium 11 is accommodated in a space between the upper and the lower liners 14-1 and 14-2.

In the floppy disk device 10 of the above-mentioned structure, the magnetic disk medium 11 is constantly kept in contact with the upper and the lower subsidiary liners 31-1 and 31-2 when the magnetic disk 11 is either rotated or not. Therefore, the recording surfaces of the magnetic disk medium 11 are inhibited from being deeply bent in the vertical direction.

The upper shell 12 is provided with an upper recess 12a formed on its inner surface to face the upper subsidiary liner 31-1 through the upper liner 14-1. Likewise, the lower shell 13 is provided with a lower recess 13a formed on its inner surface to face the lower subsidiary liner 31-2 through the lower liner 14-2. When the magnetic disk medium 11 and the upper and the lower liners 14-1 and 14-2 are slightly bent, the upper and the lower recesses 12a and 13a serve as clearances to accommodate bent portions. The upper and the lower recesses 12a and 13a are greater in outer dimension than the upper and the lower subsidiary liners 31-1 and 31-2, respectively.

In the foregoing embodiment, each of the upper and the lower subsidiary liners 31-1 and 31-2 is attached to only a limited part of each of the upper and the lower liners 14-1 and 14-2. Alternatively, a plurality of the upper and/or the lower subsidiary liners 31-1 and 31-2 may be attached to the upper and/or the lower liners 14-1 and 14-2 at an appropriate interval.

In the recording disk device 10 of the above-mentioned structure, the subsidiary liners 31-1 and 31-2 are kept in contact with the both surfaces of the magnetic disk medium 11 during the rotation of the magnetic disk medium 11, as described above. Therefore, the recording surfaces of the magnetic disk medium 11 are inhibited from being deformed or bent in the vertical direction.

With the recording disk device of the foregoing embodiment, the upper and the lower subsidiary liners 31-1 and 31-2 attached to the upper and the lower liners 14-1 and 14-2 are kept in contact with the magnetic disk medium 11. Therefore, the magnetic disk medium 11 is prevented from being fluttered. As a result, it is possible to assure stable reading/writing operations.

Since the entire surfaces of the upper and the lower liners 14-1 and 14-2 are not brought into contact with the magnetic disk medium 11, it is possible to reduce the load torque during the rotation of the magnetic disk medium 11 driven by the motor, as compared with the conventional recording disk device including the lifter.

In addition, the fine dust can be removed without the lifter. Thus, it is possible to obtain the recording disk device which comprises a reduced number of components and which is excellent in assemblability.

What is claimed is:

1. A recording disk device comprising:

a sheet-like magnetic disk medium having first and second surfaces, at least one of which is a recording surface;

a jacket body enclosing said magnetic disk medium and in which said magnetic disk medium is rotatable, said jacket body having first and second inner surfaces respectively facing said first and second surfaces of said magnetic disk medium;

upper and lower liners attached to said first and said second inner surfaces of said jacket body to remove fine dust adhered to said magnetic disk medium; and upper and lower subsidiary liners each of which is attached to at least a part of each of said upper and lower liners such that when said magnetic disk medium is rotated within said jacket body, said magnetic disk medium is interposed between said upper and lower subsidiary liners with both surfaces of said magnetic disk medium kept in contact with said upper and lower subsidiary liners;

wherein said jacket body comprises parallel upper and lower shells, and said upper and said lower liners are respectively attached thereto;

wherein said upper and lower shells have inner surfaces facing said upper and lower subsidiary liners through said upper and lower liners, respectively; and wherein at least one of said inner surfaces of said upper and lower shells is provided with a recess for accommodating a bent portion of said magnetic disk medium which occurs when said magnetic disk medium is deformed or bent.

2. The recording disk device as claimed in claim 1, wherein said recess is greater in outer dimension than said upper and lower subsidiary liners.

3. The recording disk device as claimed in claim 1, wherein each of said upper and lower liners and said upper and lower subsidiary liners comprises a non-woven fabric.

4. The recording disk device as claimed in claim 1, wherein each of said upper and lower liners partially covers said inner surface of each of said upper and lower shells and is attached thereto by welding.

* * * * *